Nov. 14, 1967  E. W. HAUG  3,352,138
TOOL FOR FORMING TOOTHED PARTS
Filed Oct. 23, 1965  3 Sheets-Sheet 1
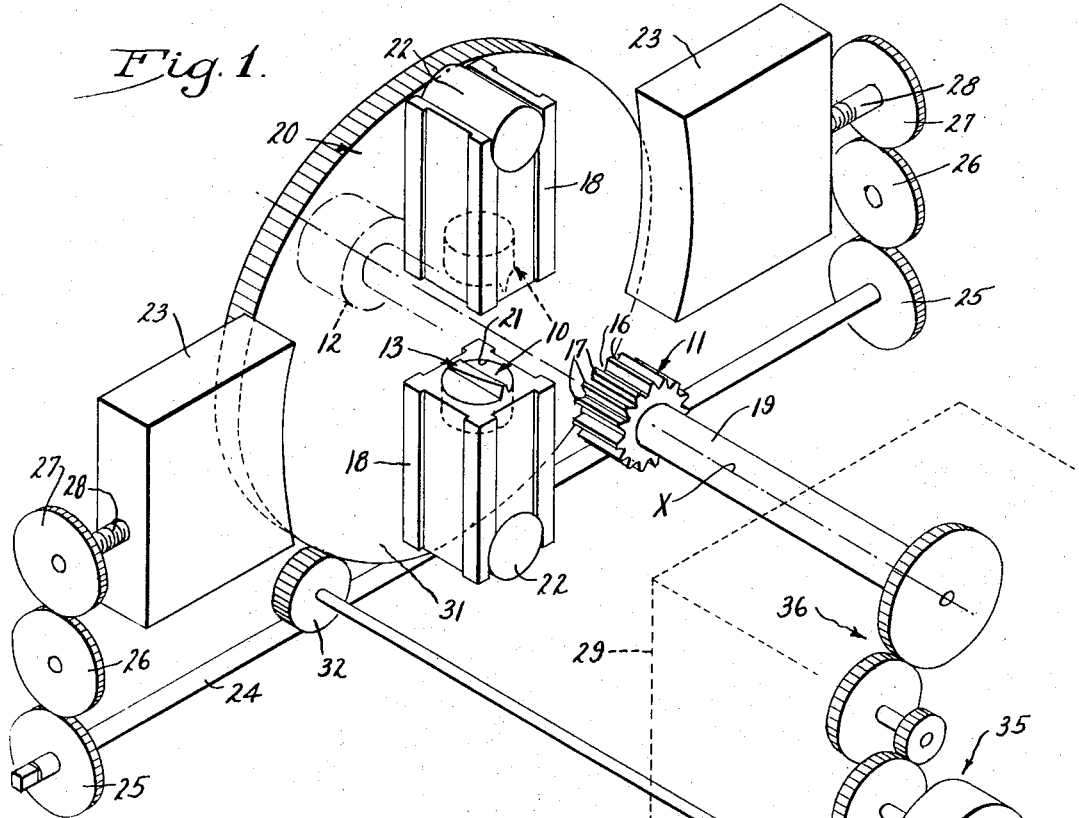
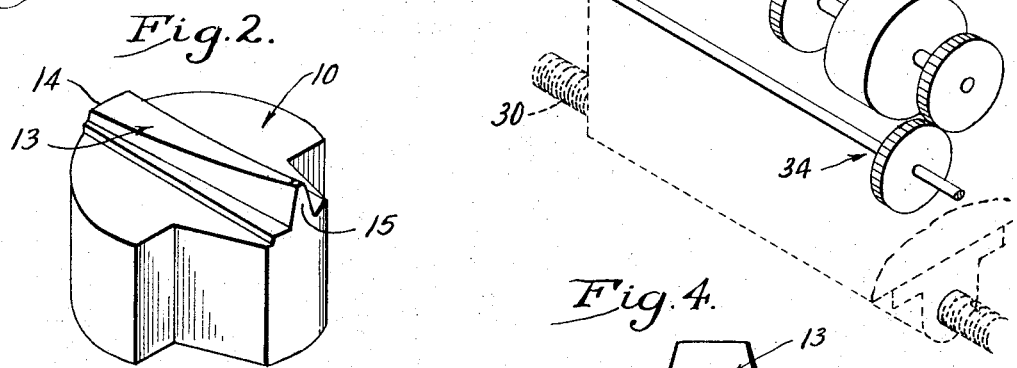
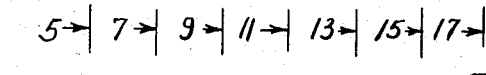
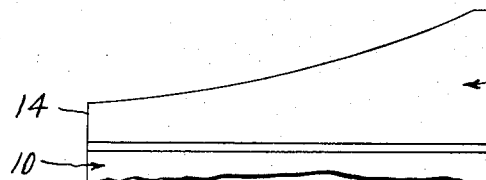
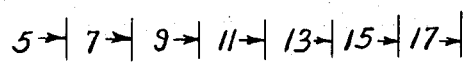
INVENTOR.
Edward W. Haug
BY
ATTORNEYS Nov. 14, 1967  E. W. HAUG  3,352,138
TOOL FOR FORMING TOOTHED PARTS
Filed Oct. 23, 1965  3 Sheets-Sheet 2

INVENTOR.
Edward W. Haug
BY Wolfe, Hubbard,
Voit & Osann
ATTORNEYS

Nov. 14, 1967  E. W. HAUG  3,352,138
TOOL FOR FORMING TOOTHED PARTS

Filed Oct. 23, 1965  3 Sheets-Sheet 3

INVENTOR.
Edward W. Haug
BY Wolfe, Hubbard,
Voit & Osann
ATTORNEYS

United States Patent Office 3,352,138
Patented Nov. 14, 1967

3,352,138
TOOL FOR FORMING TOOTHED PARTS
Edward W. Haug, Rockford, Ill., assignor to Barber-Colman Company, Rockford, Ill., a corporation of Illinois
Filed Oct. 23, 1965, Ser. No. 502,965
5 Claims. (Cl. 72—76)

This invention relates to a tool adapted for forming teeth on a part such as a gear by flowing the metal of a workpiece to form the teeth of a gear. The metal may, for example, be produced by impacting the workpiece or by a rolling operation. More particularly, the invention has reference to a tool which includes an elongated rib which is either straight or arcuate and which is forced into the periphery of the workpiece to form an interdental space and the sides of the teeth adjacent that space. With such a tool, the workpiece is fed relative to the tool so that the rib advances across the periphery of the workpiece and successive portions of the rib act on the work. The leading end of the rib is comparatively shallow and the rib increases in depth toward the trailing end whereby the interdental space is made progressively deeper during the advance of the rib. The trailing end of the rib is complemental to the shape of the desired interdental space to give this space and the gear teeth their final form.

The principal object of the invention is to provide a rib with a novel shape so as to form the teeth without applying substantial lateral pressure and thereby eliminate the danger of weakening the teeth during the forming operation.

A more detailed object is to reduce the lateral pressure by giving each portion of the rib a cross sectional shape closely matching the final shape of a corresponding part of the interdental space so that the metal flow within the tooth is primarily radial rather than lateral.

Another object is to provide a tool which forms the teeth by the flow of metal without the formation of either ribs or valleys in the top surfaces of the teeth.

Other objects and advantages of the invention will become apparent from the following detailed description taken in connection with the accompanying drawings, in which:

FIGURE 1 is a schematic perspective view of a gear forming machine adapted to use the novel tool of the present invention.

FIG. 2 is an enlarged perspective view of the tool.

FIG. 3 is an enlarged side view of the rib portion of the tool.

FIG. 4 is a fragmentary end view of the rib portion.

Figure 5:
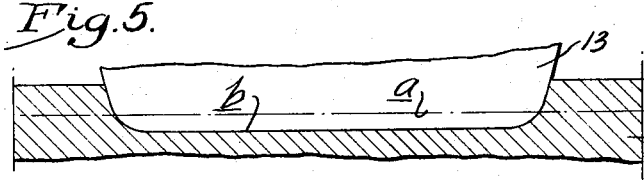
FIG. 5 is an enlarged sectional view taken along the line 5—5 in FIG. 3.

As shown in the drawings for purposes of illustration, the invention is embodied in a tool 10 which is adapted to form a gear 11 from a cylindrical workpiece 12 by flowing the metal of the workpieces as by rolling or by impacting the periphery of the workpiece. In the illustrated embodiment, the tool is designed for impacting and comprises an elongated rib 13 which is advanced endwise and generally longitudinally of the workpiece. The leading end 14 of the rib (FIG. 2) is comparatively shallow and the trailing end 15 is substantially higher whereby, as the rib impacts the periphery of the workpiece, it penetrates progressively deeper into the work. The trailing end 15 of the rib 13 has a shape complemental to the shape of the interdental spaces 16 on the gear 11 being formed so that this end of the rib gives these spaces and the adjacent teeth 17 their final form. Where a rolling operation is used, the rib may be arcuate and wrapped around the periphery of a suitable arbor.

The tool 10 may be used in an impact gear forming machine of the type disclosed and claimed in my copending application Ser. No. 503,193, filed Oct. 23, 1965, to which reference may be had for the details of construction and operation. Such a machine is illustrated schematically in FIG. 1 and includes a pair of tool slides 18 each of which carries a tool 10 and which periodically slide radially inwardly to impact the periphery of the workpiece or gear blank 12. The latter is supported on the end of a spindle 19 which turns relative to the slides so that the tools form the successive teeth on the gear blank and which moves axially of the slides so that the tools form the teeth from one end of the blank to the other.

More specifically, the slides 18 are mounted in a tool head 20 which rotates about the axis $x$ of the spindle 19. The slides are disposed on diametrically opposite sides of the axis and the tools 10 are mounted on the inner ends of the slides with the ribs 13 facing radially toward the axis. Thus, as the slides move toward each other, they impact opposite sides of the gear blank 12. The tools may, as shown, be generally cylindrical plugs with the ribs 13 formed integrally on the ends thereof and the plugs are received and held in bores 21 in the inner ends of the slides.

At their outer ends, the slides carry rollers 22 which serve as cam followers and which coact with normally stationary cams 23 disposed on opposite sides of the tool head 20. Thus, as the rollers travel across the inner ends of the cams 23, the slides 18 are cammed inwardly to impact the tools 10 against the gear blank 12. The radial position of the cams 23 and hence the depth of impact may be adjusted by manually turning a shaft 24. The latter carries spur gears 25 which, through idler gears 26, drive gears 27 fast on screws 28. The screws are threaded into the back of the cams 23 and shift the cams back and forth when turned by the shaft 24. After the rollers 22 leave the cams 23, they are retracted by centrifugal force and by suitable springs (not shown).

The spindle 19 is journaled in a carriage 29 which is shiftable longitudinally of the axis $x$ so that the gear blank 12 may be advanced from a position behind the tool head 20 through the space between the tool slides 18 and out to the front of the tool head. Such shifting of the carriage is produced by a feed screw 30 driven from a suitable power source (not shown). The spindle is turned from the tool head 20 which carries a gear 31 meshing with a gear 32 fast on a shaft 33. The latter extends to and is journaled in the carriage and drives the spindle through gearing 34, a variable speed drive 35 and gearing 36.

The gears of the gearings 34 and 36 are selected to turn the spindle 19 at an average speed faster than the speed of the tool head 20 by an amount which indexes the spindle relative to the tool head 20 through an angular distance equal to the spacing of the teeth 17 each half revolution of the tool head. Thus, the tools 10 form succeeding teeth upon successive impacts. The variable speed drive 35 produces a cyclical turning of the spindle 19, that is, the spindle alternately speeds up and slows down. The slower speed approximately matches the speed of the tool head and occurs during the period of impact so that there is substantially no relative rotation between the tools 10 and the gear blank 12 at impact. The higher speed thereafter produces the relative indexing of the gear blank. The specific construction and operation of the variable speed drive 35 is shown and described in my copending application described above.

In accordance with the present invention, the rib 13 of the tool 10 is formed in a novel manner so as to reduce or limit the lateral pressure applied to the gear teeth as they are formed and thereby insure the ultimate strength of the teeth. More specifically, the lateral or side pressure on a tooth is never great enough to deflect and permanently deform that portion of the tooth which has been formed. To achieve this, the rib 13 is arranged so that the growth of the tooth itself is essentially radial.

In general, the foregoing is achieved by shaping the rib 13 so that successive portions of the rib give approximately the final form to successive portions of the tooth beginning at the outer end of the tooth and progressing radially inwardly. Thus, the shallow end 14 of the rib forms the extreme outer end portion of the gear tooth on the first impact. The next part of the rib to impact the blank 12 moves the tooth portion first formed radially outwardly and forms the tooth portion just underneath. This is continued as the rib progresses through the gear blank until the trailing end 15 of the rib forms the root of the tooth.

Figure 6:
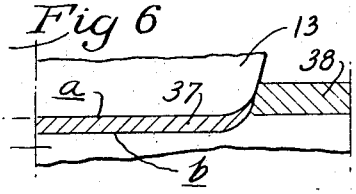
FIG. 6 is a view similar to FIG. 5 but showing half of the rib and illustrating the metal flow.
Figure 7:
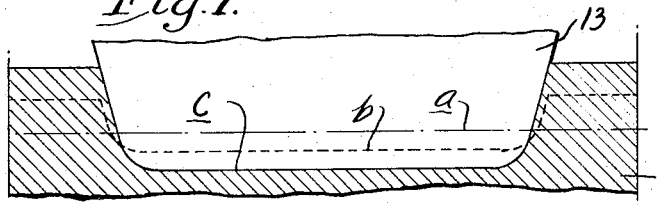
FIG. 7 is an enlarged fragmentary sectional view taken along the line 7—7 in FIG. 3.
Figure 8:
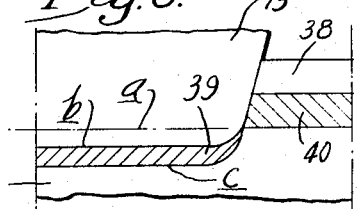
FIG. 8 is a view similar to FIG. 7 but showing half of the rib and illustrating the metal flow.
Figure 9:
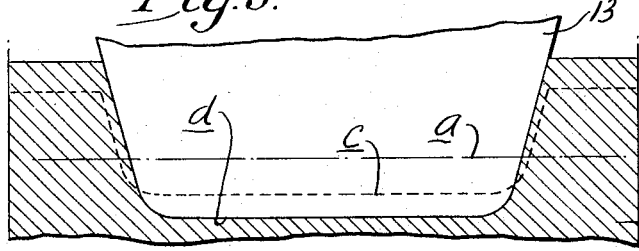
FIG. 9 is an enlarged fragmentary sectional view taken along the line 9—9 in FIG. 3.
Figure 10:
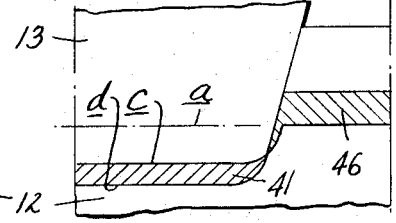
FIG. 10 is a view similar to FIG. 9 but showing half of the rib and illustrating the metal flow.
Figure 11:
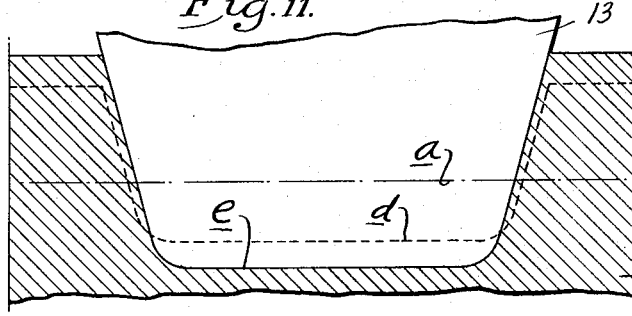
FIG. 11 is an enlarged fragmentary sectional view taken along the line 11—11 in FIG. 3.
Figure 12:
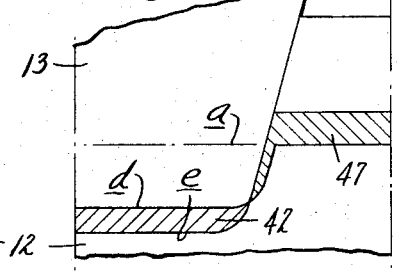
FIG. 12 is a view similar to FIG. 11 but showing half of the rib and illustrating the metal flow.
Figure 13:
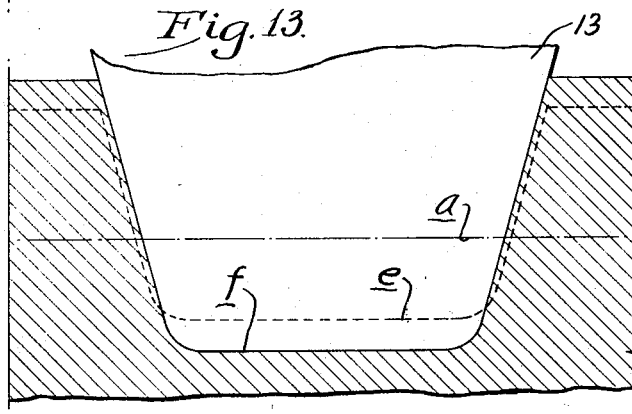
FIG. 13 is an enlarged fragmentary sectional view taken along the line 13—13 in FIG. 3.
Figure 14:
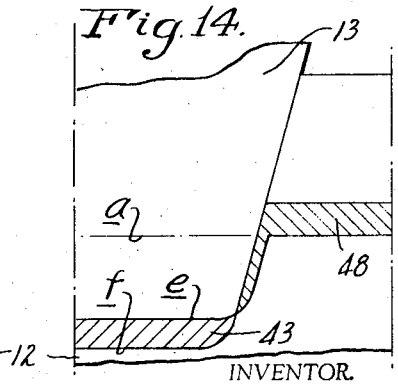
FIG. 14 is a view similar to FIG. 13 but showing half of the rib and illustrating the metal flow.
Figure 15:
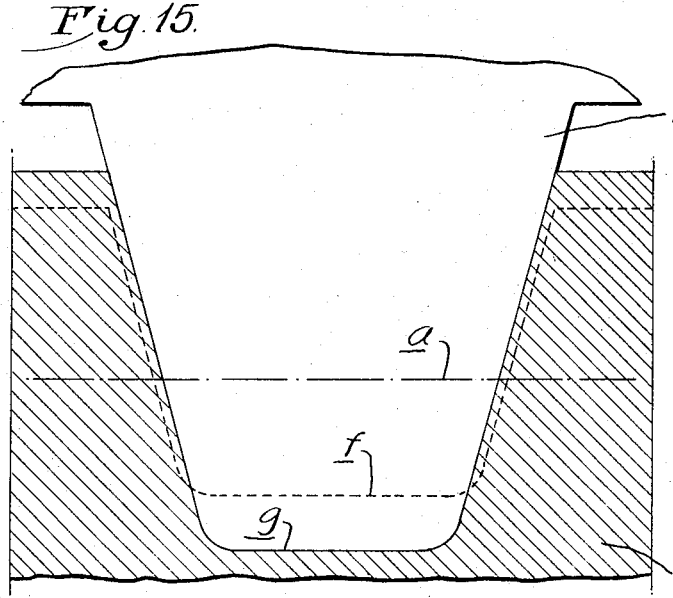
FIG. 15 is an enlarged fragmentary sectional view taken along the line 15—15 in FIG. 3.
Figure 16:
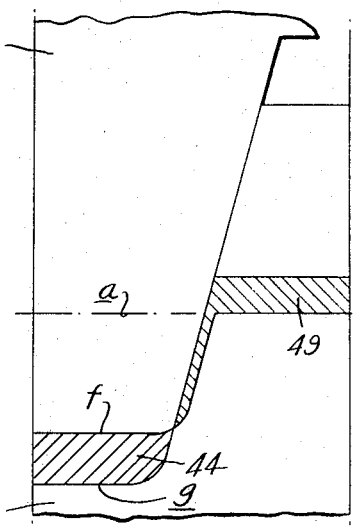
FIG. 16 is a view similar to FIG. 15 but showing half of the rib and illustrating the metal flow.
Figure 17:
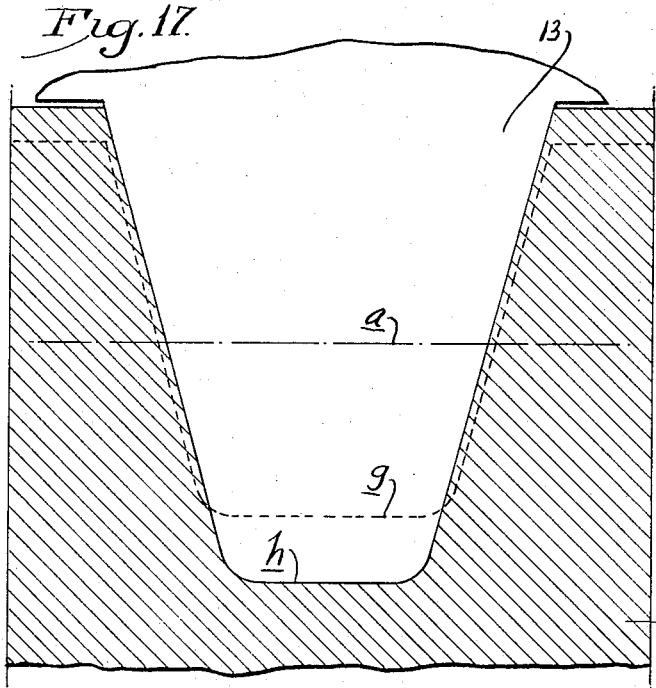
FIG. 17 is an enlarged fragmentary sectional view taken along the line 17—17 in FIG. 3.

FIGS. 5 through 18 illustrates schematically the configuration of the tool rib 13 from one end to the other and the manner in which the successive portions of the rib form one pocket or interdental space 16 and the adjacent gear teeth 17 at one point along the length of the gear. FIGS. 5 and 6 show the work performed by the shallow, leading end 14 of the rib although it should be noted that the first part of the rib to engage the workpiece in actual practice would be spaced in a slight distance from this end. This portion of the rib strikes the surface $a$ of the gear blank 12 and penetrates the latter to a depth $b$. In doing so, the rib displaces metal indicated by the area 37 in FIG. 6 and this metal flows laterally and causes an equal amount of metal, indicated by the area 38, to flow radially outwardly alongside the rib.

Ideally, the cross section of the rib 13 at the leading end 14 is the same as the cross section of the interdental space of the ultimate gear at the extreme outer ends of the gear teeth. In actual practice, however, the width of the rib is slightly smaller than this. As a result, the metal area 38 closely approximates the size and shape of the outer end portion of the gear tooth being formed. Moreover, this portion of the tooth remains essentially the same and is not materially reformed during the remainder of the gear-forming operation.

On the second impact (FIGS. 7 and 8), the rib 13 has been advanced endwise relative to the workpiece and, as a result, the portion of the rib at the section line 7—7 of FIG. 3 engages the pocket. This portion impacts the pocket at the previously formed surface $b$ and penetrates to a level $c$. This displaces metal below the rib, indicated by the area 39, which flows laterally and causes an equal amount of metal to flow out along the rib and form the area 40. This also raises the tooth portion 38 formed on the first impact. As will be seen from a comparison of FIGS. 5 and 7, the portion of the rib which penetrates the work on the second impact is narrower than that which is effective on the first impact. The width of this portion is such that the metal area 40, which is just below the area 38, is given substantially its final shape as is the portion of the tooth between this area and the level $c$. At the same time, the shape of the rib at this point bears against the tooth portion formed on the first impact to retain the shape of that part of the tooth without materially reforming it.

The tooth continues to grow in this manner upon successive impacts. Thus, the rib 13 penetrates to the levels $d$, $e$, $f$, $g$ and $h$ in the succeeding impacts as illustrated in FIGS. 9, 11, 13, 15 and 17 respectively. As a result of these impacts, metal represented by the areas 41, 42, 43, 44 and 45 (FIGS. 10, 12, 14, 16 and 18) is displaced laterally from beneath the rib and causes radial growth of the gear tooth as represented by the areas 46, 47, 48, 49 and 50. Between impacts, the rib 13 has advanced lengthwise relative to the work to bring successive portions of the rib into action. Each succeeding portion of the rib is deeper than the preceding portion so that the rib produces the successive penetrations without changing the stroke of the corresponding slide 18.

Figure 18:
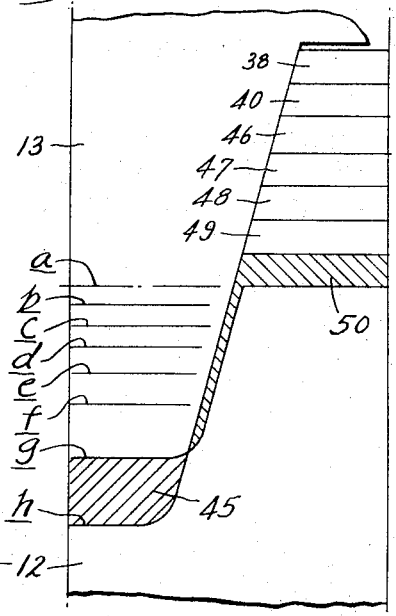
FIG. 18 is a view similar to FIG. 17 but showing half of the rib and illustrating the metal flow.

In cross section, the impacting face and the penetrating portion of the rib become narrower to correspond to the narrowing of the interdental space toward the bottom of the latter. Behind this, the shape of the rib matches that much of the tooth as had been formed in prior impacts so that this previously formed portion moves up against the rib but is not materially reshaped by the latter. The composite growth of the tooth above the original surface $a$ of the gear blank and penetration below this surface is shown in FIG. 18. It will be seen that the growth of the tooth is essentially radial and without the application of lateral force which might permanently fatigue the tooth. In this regard, the lateral force involved is between the rib and the tooth and would be the force which would result from a previously formed portion of the tooth moving up against the rib.

The foregoing description in connection with FIGS. 5 through 18 is based upon an ideal and somewhat theoretical operation to explain the principle of the invention. The actual practice of the invention would deviate from this illustration to some degree. For example, a greater number of impacts, such as twenty, would be used to form each tooth completely. Also, the successive impacts need not produce equal increments of tooth growth. Thus, the depth of the rib 13 may be shaped so that the earlier impacts produce greater increments of growth than the later impacts which thereby perform, in effect, a finishing operation. Moreover, it should be understood that the impacts do not produce distinct and well-defined layers as represented by the areas 38, 40, 46, 47, 49 and 50 but, instead, these increments of growth merge with each other.

It also is important to understand that, within the scope of the invention, the width of the rib 13 may be varied. In the example given above, the width of the rib at each point along its length exactly matches the width of that portion of the interdental space being formed. This is the theoretical ideal and, for practical purposes, the maximum width. In practice, the width of the rib would be somewhat narrower than this. As a result, each impact produces some reshaping of that portion of the tooth which had been formed by previous impacts and this causes some lateral pressure to be applied to the tooth. The limit as to how narrow the rib may be at any point is the width which results in a lateral pressure less than would be required to deflect and permanently deform that much of the tooth which has been formed at the time of the impact. In other words, the lateral pressure may be sufficient to flow metal at the surface of the tooth but the total force will not deflect and deform the tooth considering the tooth as in the nature of a beam. For brevity, the magnitude of this force may be said to be less than the "beam strength" of the tooth. Also, the width of the rib may be slightly wider than the theoretical ideal but, from the practical standpoint, the permissible variation in this direction is quite small. In any event, the trailing end 15 of the rib is exactly complemental to ultimate interdental space to give the gear teeth their final form. It should also be noted that the teeth grow without the formation of either ribs or valleys in the outer or top surface of the teeth.

I claim as my invention:

1. A tool for forming teeth by flowing the metal of a cylindrical workpiece and adapted to be advanced progressively relative to the workpiece longitudinally thereof, said tool comprising an elongated rib opposing the periphery of the workpiece and extending generally longitudinally thereof, said rib having a shallow leading end and a higher trailing end, the cross sectional shape of said trailing end being complemental to the shape of an interdental space and portions of the adjacent teeth on the gear to be formed, said leading end having a cross sectional shape substantially complemental to the extreme outer portion of said interdental space, said rib being defined by side surfaces tapering progressively from said trailing end to said leading end and by a top surface tapering progressively from said leading end to said trailing end.

2. A tool as defined by claim 1 in which the cross sectional area of said rib increases by substantially equal amounts at successive equal increments along the rib from said leading end to said trailing end.

3. A tool for forming teeth by flowing the metal of a cylindrical workpiece and adapted to be advanced progressively relative to the workpiece longitudinally thereof, said tool comprising an elongated rib opposing the periphery of the workpiece and extending generally longitudinally thereof, said rib having a shallow leading end and a higher trailing end, the cross sectional shape of said trailing end being complemental to the shape of an interdental space and portions of the adjacent teeth on the gear to be formed, said leading end having a cross sectional shape substantially complemental to the cross sectional shape of the outer portion of said interdental space and being large enough whereby the lateral force between the rib and the tooth being formed is less than the beam strength of the tooth, said rib being defined by top and side surfaces inclined gradually from said leading end to said trailing end.

4. A tool as defined by claim 3 in which the cross sectional area of said rib increases in substantially equal amounts at successive equal increments along the rib from said leading end to said trailing end.

5. A tool as defined by claim 3 in which the rib at any place along its length produces a lateral force between the rib and the tooth less than the beam strength of so much of the tooth as has been formed.

References Cited
UNITED STATES PATENTS

| | | | |
|---|---|---|---|
| 460,566 | 10/1891 | Dayton | 72—402 |
| 2,642,762 | 6/1953 | Evans | 72—76 |
| 3,084,571 | 4/1963 | Appel | 72—402 |
| 3,130,611 | 4/1964 | Specht | 72—402 |

CHARLES W. LANHAM, *Primary Examiner.*

L. A. LARSON, *Assistant Examiner.*